United States Patent [19]

Gupta et al.

[11] Patent Number: 6,138,095
[45] Date of Patent: Oct. 24, 2000

[54] SPEECH RECOGNITION

[75] Inventors: Sunil K. Gupta, Edison; Frank Kao-Ping Soong, Warren, both of N.J.

[73] Assignee: Lucent Technologies Inc., Murray Hill, N.J.

[21] Appl. No.: 09/145,934

[22] Filed: Sep. 3, 1998

[51] Int. Cl.[7] ............................. G10L 15/00; G10L 15/20
[52] U.S. Cl. .......................... 704/234; 704/254; 704/233
[58] Field of Search ........................... 704/234, 251–257, 704/231, 250, 233

[56] References Cited

U.S. PATENT DOCUMENTS

| 5,440,662 | 8/1995 | Sukkar | 704/256 |
| 5,710,864 | 1/1998 | Juang et al. | 704/256 |
| 5,797,123 | 8/1998 | Chou et al. | 704/256 |
| 5,832,430 | 11/1998 | Lleida et al. | 704/256 |

OTHER PUBLICATIONS

Caminero, J; de la Torre, C.; Villarrubia, L.; Martin, C; Hernandez, L.; "On–line Garbage Modeling with Discriminant Analysis for Utterance Verification", *Proc. Int. Conf. on Spoken Language Processing*, vol. 4, pp. 597–600, 1993.

Villarrubia, L; Acero, A,; "Rejection Techniques for Digit Recognition in Telecommunication Applications", *Proc. Int. Conf. Acoust. Speech Sign. Process.*, vol. 2, pp. 455–458, 1993.

Chigier, B.; "Rejection and Keyword Spotting Algorithms for a Directory Assistance City Name Recognition Application", *Proc. Int Conf. Acoust. Speech Sign. Process*, vol. 2, pp. 93–96, 1992.

Rose, R., "Discriminant Wordspotting Techniques for Rejecting Non–Vocabulary Utterances in Unconstrained Speech", *Proc. Int. Conf. Acoust. Speech Sign. Process.*, vol. 2, pp. 105–108, 1992.

Li, Q; Juang, B.–H.; Zhou, Q., Lee, C.–H., "Verbal Information Verification", *Proc. European Conference on Speech Communication and Technology*, vol. 2, pp. 839–842, 1997.

Parthasarathy, S., Rosenberg, A.; "General Phrase Speaker Verification Using Sub–word Background Models and Likelihood–ratio Scoring", *Proc. Int. Conf. on Spoken Language Processing*, vol. 4, pp. 2403–2406, 1996.

Sukkar, R.; Lee, C.–H.; "Vocabulary Independent Discriminative Utterance Verification for Nonkeyword Rejection in Subword Based Speech Recognition", *IEEE Trans. Speech Audio Process.*, vol. 4, No. 6, pp. 420–429, 1996.

Rahim, M.,; Lee, C.–H.; Juang, B.–H.; "Discriminative Utterance Verification for Connected Digits Recognition", *IEEE Trans. Speech Audio Process.*, vol. 5, No. 3, pp. 266–277, 1997.

Rahim, M; Lee, C.–H.; "String–based minimum verification error (SB–MVE) training for speech recognition", Computer Speech and Language, vol. 11, pp. 17–160, 1997.

Rahim, M.; Lee, C.–H.; "A study on robust utterance verification for connected digits recognition", J, Acoust. Soc. Am., vol. 101, No. 5, pp. 2892–2902, 1997.

*Primary Examiner*—David D. Knepper
*Attorney, Agent, or Firm*—Howard R. Popper

[57] ABSTRACT

Speech recognition in which the log probabilities of the null and alternative hypothesis are computed for an input speech sample by comparison with specific stored speech vocabularies/grammars and with general speech characteristics. The difference in probabilities is normalized by the magnitude of the null hypothesis to derive a likelihood factor which is compared with a rejection threshold that is utterance-length dependent. Advantageously, a high-order polynomial representation of the rejection threshold length dependency may be simplified by a series of piece-wise constants which are stored as rejection thresholds to be selected in accordance with the length of the input speech sample.

7 Claims, 3 Drawing Sheets

SPEECH RECOGNITION

FIELD OF INVENTION

This invention relates generally to the field of speech recognition and, more particularly, to the recognition of speech under ambient conditions which tend to contain spurious speech-like sounds.

BACKGROUND OF THE INVENTION

Most state-of-the art speech recognition systems incorporate an utterance rejection module to reject speech-like utterances in which the recognition system has low confidence. A situation inspiring low confidence occurs when the speaker employs an open microphone that picks up spurious background noises or when something is uttered or picked-up that is phonetically similar to, but is not, a legitimate phrase. For example in U.S. Pat. No. 5,710,864 assigned to the assignee of the present invention, discriminative techniques are employed wherein both keywords and phonetically similar alternatives (anti-models) are stored in vocabularies and compared with the input speech and an output signal is generated representing a confidence measure corresponding to the relative accuracy of the identification step. The confidence measure uses a likelihood ratio test that is also known as hypothesis testing. In hypothesis testing, the null hypothesis (that the input utterance is correctly recognized), is tested against the alternate hypothesis that the input utterance is not correctly recognized. If the likelihood ratio (normalized by the utterance length) between the null and alternate hypothesis exceeds a critical threshold, the utterance is accepted as correctly recognized, otherwise, the utterance is rejected.

In statistical hypothesis testing, the problem formulation is to test the null hypothesis, $H_0$, that the input speech utterance $O = \vec{o}_1 \cdot \vec{o}_2 \ldots o_t$ is correctly recognized, against the alternate hypothesis $H_1$. If the probabilities for the null and alternate hypotheses are known exactly, then according to the Neyman Person lemma, the optimal test (in the sense of maximizing the power of the test) is usually the probability ratio test such that the null hypothesis, $H_0$ is accepted if the likelihood ratio between the null and alternate hypothesis exceeds a critical threshold. This criterion, expressed in log domain and normalized by the utterance length is:

$$L_r = \frac{1}{T}(\log P(O|H_0) - \log P(O|H_1)) > \eta \quad (1)$$

where T is the length of the input utterance, log $P(O|H_0)$ and log $P(O|H_1)$ are, respectively, the log-probability of the input utterance for the null hypothesis and the alternate hypothesis, and $\eta$ is the rejection threshold of the test. For testing simple hypotheses where the probability density functions for $H_0$ and $H_1$ are known exactly, the likelihood ratio test is the most powerful test for a given level of significance.

We have found that while the above method works well for long utterances it works quite poorly for short utterances. Many more short, out-of-grammar utterances tend to be accepted by the system as having been correctly recognized whereas these utterances should not be accepted.

SUMMARY OF THE INVENTION

In accordance with our invention we have found that rejection performance can be improved, especially where it may not be possible to store a sufficient number of anti-models, by employing a variable threshold for rejection that depends on the length of the input utterance rather than being a constant that is independent of utterance length. More particularly, a separate rejection threshold, $v_i$, is derived for each interval representing the input utterance lengths. In an illustrative embodiment, the likelihood of the input utterance for the null-hypothesis is obtained from the task grammar and the likelihood for the alternate hypothesis is computed using the garbage loop grammar. A three state hidden Markov model, trained on a large speech database, may be used to represent the garbage model or the broad characteristics of speech. A rejection threshold v, is modeled as a polynomial in utterance length T $v(T) = a_{m-1}T^{m-1} + a_{m-2}T^{m-2} + \ldots a_1 T^1 + a_0$, where, m−1 is the order of the polynomial, and $a_i$, $0 \leq i \leq m$ are the coefficients of the polynomial, can be further simplified by piece-wise constant approximation using N values, $v_i$, $0 < i \leq N$, derived for each interval representing the input utterance lengths. In an experimental embodiment, the approximation to the polynomial resulted in a reduction of almost 23% in both false alarm (Type II) errors and false rejection (Type I) errors at the equal error rate threshold.

BRIEF DESCRIPTION OF THE DRAWING

The foregoing and other objects and features of the invention may be more clearly understood from the ensuing description when read together with the drawing in which.

GENERAL DESCRIPTION

For speech recognizers based on the hidden Markov model (HMM) recognition/classification system, the likelihood of the input utterance for the null-hypothesis, log $P(O|H_0)$, and the likelihood for the alternate hypothesis, log $P(O|H_1)$ can be estimated by using a parametric form of the conditional densities and the distribution of the hypothesis. However, the possible mismatch between the "true" and estimated parametric distributions invalidates the optimality of the likelihood ratio test given by equation (1).

Figure 1:
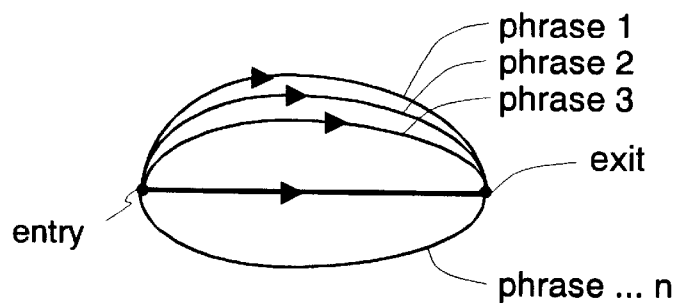
FIG. 1 shows an example of a grammar which can be used to recognize n phrases.

The log-probability of the input utterance given the null-hypothesis, log $P(O|H_0)$, is estimated to be the log-likelihood of the recognized utterance for the task grammar. FIG. 1 shows an example of a task grammar which can be used to recognize one of n phrases.

Figure 2:
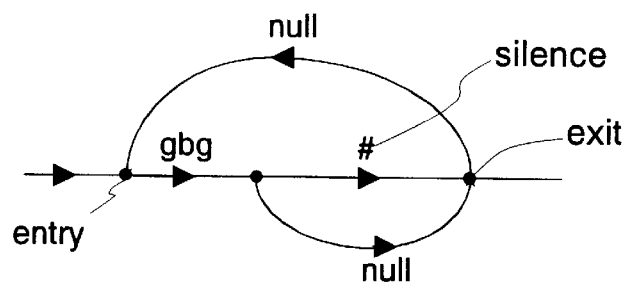
FIG. 2 depicts garbage loop grammar used to obtain the likelihood of the alternative hypothesis.

In order to estimate the log-likelihood of the input utterance given the alternate hypothesis, a single hidden Markov model (HMM) is trained on a large speech database. This model, known as a garbage model, represents the broad characteristics of speech. Previously, a single state general speech model for speaker verification, as reported by S. Parthasarathy and A. E. Rosenberg in "General phrase speaker verification using sub-word background models and likelihood ratio scoring", *Proc. Int. Conf. on Spoken Language Processing*, vol. 4, pp. 2403–2406, 1996. However, a three-state, garbage model (with the same topology as a sub-word model) can also be considered as a generic phoneme model. A grammar such as the one shown in FIG. 2 is used to compute the log-likelihood of the input utterance, given that it belongs to the alternate hypothesis. FIG. 2 depicts garbage loop grammar used to obtain the likelihood of alternative hypothesis. Note that "gbg" represents the garbage model and "#" represents the background noise model.

Note that in equation (1), the utterance length T is used as a normalization factor. The rejection criterion is then given by the following equation:

$$L_r \begin{cases} \geq \eta & \text{accept} \\ \text{otherwise} & \text{reject} \end{cases} \quad (2)$$

Equation (2) is based upon the assumption that the critical threshold $\eta$ is fixed, and is independent of utterance length. We will show that this assumption may not be appropriate for decoding grammars such as the one in FIG. 1 that has several alternate paths.

We use a modified likelihood ratio measure, $L_r$, given in equation (3), which is normalized by the magnitude of the log-likelihood value, $P(O|H_0)$, rather than the utterance length, T, as in equation (1).

$$L_r = \frac{(\log P(O|H_0) - \log P(O|H_1))}{|\log P(O|H_0)|} \quad (3)$$

We find that the modified likelihood ratio measure in equation (3) is much more invariant to the recognition grammar. This confidence measure has also previously been used by Li et al, in "Verbal information verification", Proc. European Conf. on Speech Commun. and Tech, vol. 2, pp. 839–842, 1997. When several alternative search paths are available during speech decoding, better likelihood values are obtained (e.g., in a free phone-loop decoding grammar). As the utterance length increases, the phrase grammar presents higher constraints for decoding. On the other hand, the phrase grammar has lower decoding constraints for shorter utterances. However, the garbage loop grammar imposes rather uniform constraints for all utterance lengths. As a consequence of the different level of constraints for the null and alternate hypothesis, the likelihood ratio is different for different utterance lengths. Therefore, in principle, rejection performance can be improved if a different rejection threshold is selected for each utterance length. However, such a solution is impractical due to finite size of the training databases. It is proposed that the rejections threshold v be modeled as a polynomial in utterance length T. That is, $$v(T) = a_{m-1}T^{m-1} + a_{m-2}T^{m-2} + \ldots a_1 T^1 + a_0, \quad (4)$$

where, m−1 is the order of the polynomial, and $a_i$, $0 \leq i \leq m$ are the coefficients of the polynomial. Note that m=2 results in a linear approximation. In our current experiments, we further simplify by using a piece-wise constant approximation.

Let $S_T = T_i$, $0 < i \leq N$ represent a set of utterance lengths such that:

$$T \epsilon T_i \text{ if } T_{i-1} \leq T < T_i, \quad (5)$$

and $T_N = \infty$. A separate rejection threshold $v_i$, $0 < i \leq N$, is derived for each interval representing the input utterance lengths.

Figure 3:
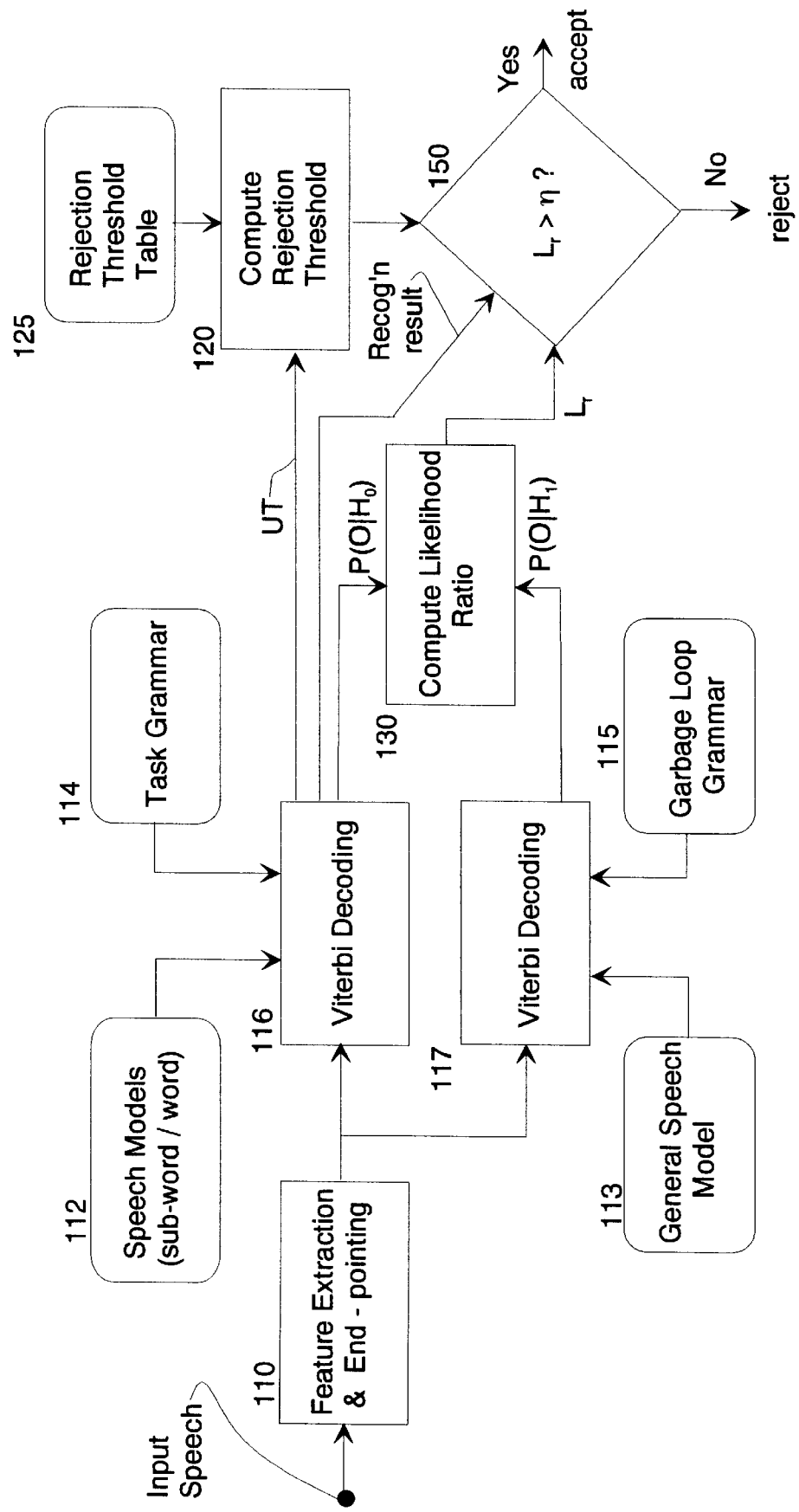
FIG. 3 is a block diagram of an utterance rejection system using utterance length rejection thresholds according to the invention.

Referring now to FIG. 3, the block diagram shows an utterance rejection system using utterance length dependent rejection thresholds and likelihood ratios normalized by the magnitude of the null hypothesis probability. The apparatus of FIG. 3 may be implemented through various technologies, for example, by the use of discrete components or through the use of large scale integrated circuitry, application specific integrated circuits and/or stored program general purpose or special purpose computers or microprocessors, including a single processor such as a digital signal processor (DSP), using any of a variety of computer-readable media. The input speech is presented to feature extraction and end-point processing block 110 at the left. Typically, the speech may be obtained from PCM encoded speech sampled at an 8 kHz rate. The extracted feature vectors are applied to decoders 116 for the null hypothesis and 117 for the alternative hypothesis. Decoders 116 and 117 are preferably Viterbi decoders that obtain the underlying HMM state sequence which is most likely to have generated the extracted feature vectors. Viterbi decoder 116 receives inputs from speech model storage 112, which stores models of subwords and/or words and from task grammar storage 114 which stores legitimate subword or word sequences. The output of Viterbi decoder 116 on the lead labeled P (O|H$_1$) provides a signal whose magnitude indicates the probability that the input sample is focused on a particular legitimate subword or word sequence. The output of Viterbi decoder 116 labeled UT provides a signal proportion to the decoded utterance length. The signal on lead UT is applied to rejection threshold computation box 120 which selects from rejection threshold storage 125 a value of rejection threshold appropriate to the length of the input utterance. The selected rejection threshold is then supplied to decision box 150.

Meanwhile the output of Viterbi decoder 117 provides a signal on the lead labeled P(O|H$_1$) whose magnitude indicates the probability that the input sample corresponds to the broad characteristics of general speech. In box 130 the magnitude of the signal on lead P(O|H$_1$) is subtracted from the magnitude of the signal on lead P(O|H$_0$) and the result is normalized by the magnitude of the P(O|H$_0$) signal. The output of box 130 appears on lead L$_r$ which provides a signal to decision box 150. Decision box 150 provides an output on lead "yes" if the magnitude of the signal on lead L$_r$ is greater than the rejection threshold supplied to it by box 120 and provides an output on lead "no" if the magnitude of the signal on L$_r$ is less than the rejection threshold. Where the output is applied to lead "yes", the recognition result is deemed valid.

Figure 4:
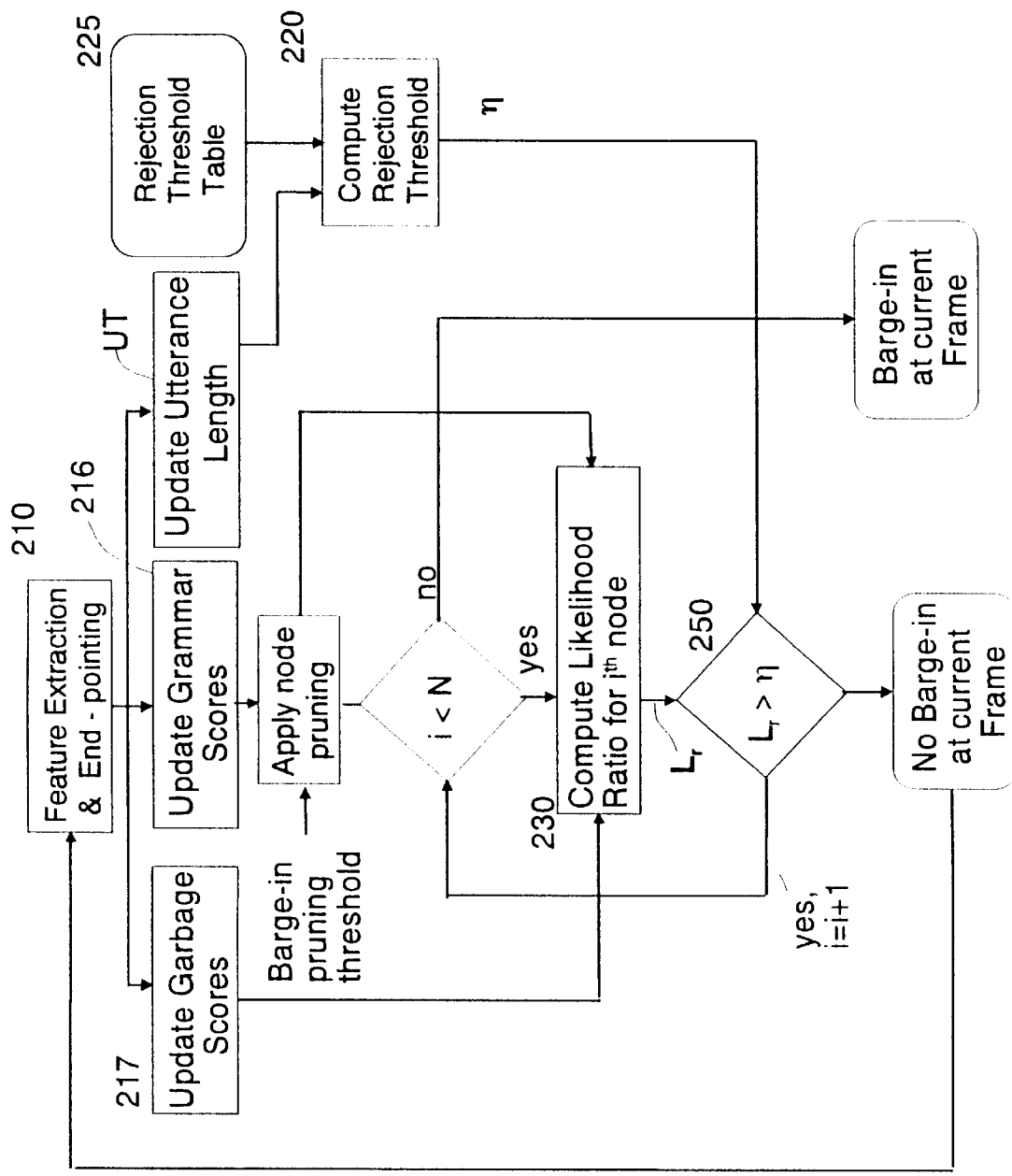
FIG. 4 is a flow chart for barge-in detection according to the invention.

Referring now to FIG. 4, the process performed by the apparatus of FIG. 3 has been adapted to improve the performance of "barge-in", or the detection of a partial valid phrase before the end of an utterance. Like standard rejection, detection of a partial valid phrase is in general more difficult in the earlier stages than later. A length-dependent threshold can therefore be equally effective in improving barge-in detection and preventing false triggering, especially in the early part of the utterance. The flow chart shows the steps of the process with respect to discriminating a "barge-in" that is performed by the apparatus of FIG. 3. The steps of the process of FIG. 4 labeled 210, 217, 216, UT, 220, 225, 230, 250 generally correspond to the steps of the process performed by the similarly numbered elements of FIG. 3 having the same second and third digits.

Examples of Experimental Results

In an experimental embodiment of our system, we used mono-phone (i.e., context-independent), sub-word units where each sub-word was a 3-state hidden Markov model with 8 Gaussian mixture components per state. Each whole-word digit model had 16-states, and 8 mixture components per state. The background model was a single-state, 16-mixture component model. Once every 10 ms, twenty-five features (12-cepstral, 12-delta cepstral and 1 delta-energy) were computed for each 30 ms frame of speech.

Figure 5:
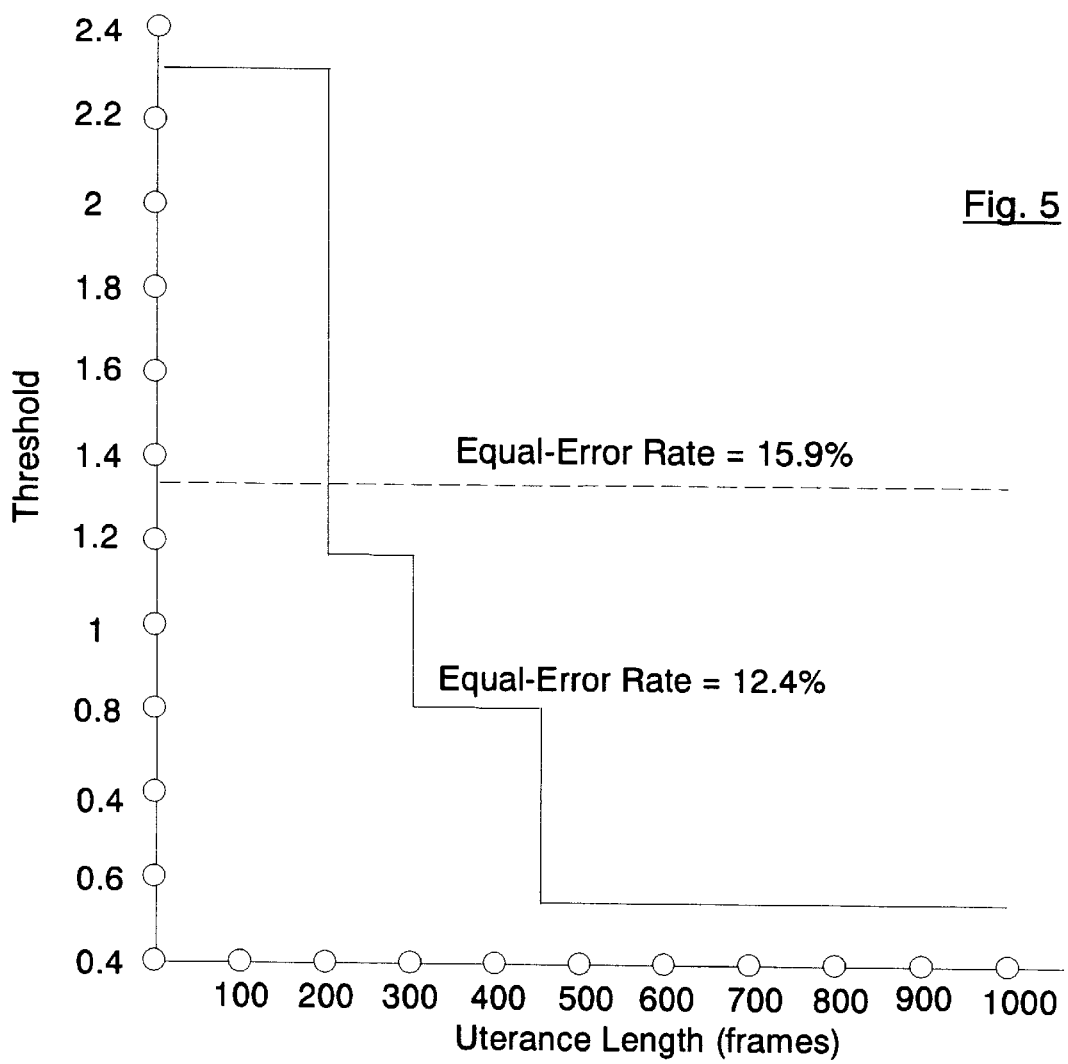
FIG. 5 is a chart showing equal error rate threshold as a function of utterance length.

A separate 3-state, 64-mixtures per state, general speech model (garbage model) was also trained using the combined databases of digits and phrases. Several different schemes were investigated in training the model. In one method, we replaced each phoneme and digit label in the transcribed training utterances with the garbage model label and performed training. We found that the best performance was achieved when each digit was also transcribed as a string of phonemes and each phoneme label was replaced by the garbage model label. The general speech model was used to normalize the likelihood of an input utterance given the null-hypothesis for a 60-phrase grammar in order to perform rejection experiments. A test database of 1,638 phrases was used to perform recognition test. The phrase database represents in-grammar sentences. Another database of connected digit strings was used for testing out-of-vocabulary rejection performance. The digit database consists of 1,327 strings of varying lengths (1, 4, 7, and 10 digits). For all experiments, utterance-level cepstral mean subtraction (CMS) was used during the model training phase. A real-time recognizer was used for recognition experiments. The recognizer used sequential cepstral mean subtraction. Furthermore, the state-transition probability values were all set to be equal during recognition to reduce computational complexity of the recognizer. The baseline recognition accuracy for the phrase database is 90.48%. For rejection experiments, the misrecognized utterances (9.52%) were included with the digits database and assumed to be out-of-grammar (since the misrecognized utterances should also be rejected). FIG. 5 compares the equal error rate threshold when a single threshold is selected with the variable equal error rate threshold for different utterance lengths. Note that the equal error rate threshold for shorter utterances is significantly higher than the fixed single threshold. For longer utterances the equal error rate is lower than the fixed threshold. The phrase test database and the digit strings database were both divided into two approximately equal sets. It is important to point out that a different approximation to the polynomial of equation (4), other than piecewise constant, could be used to further improve performance.

Conclusion

We have presented a simple but effective technique to improve the rejection performance of an automatic speech recognition system. A general speech model has been used to obtain the likelihood for the alternative hypothesis in the accept/reject decision. We have shown that the normalized likelihood ratio is better modeled as a high-order polynomial in utterance length than just a constant. The experiments show that the a simple piecewise constant approximation to the polynomial results in a reduction of almost 23% in both false alarms (Type II error) and false rejection (Type I) errors at the equal error rate threshold. We have shown that the rejection performance of shorter utterances can be improved significantly when an utterance length dependent rejection threshold is used. It should be noted that other training techniques such as discriminative training can be applied to improve the baseline recognition as well as rejection performance of the system. The length dependent thresholding technique herein proposed should also be beneficial to other more sophisticated rejection methods where discriminatively trained phone anti-models are employed. Further and other modifications may be made by those skilled in the art without, however, departing from the spirit and scope of our invention.

What is claimed is:

1. A method of recognizing speech encoded as electrical signals, comprising:

a) processing input speech signals to extract one or more feature vectors;

b) comparing the extracted feature vectors with stored speech models and a task grammar to derive a null hypothesis factor indicating the probability that the input speech is correctly recognized;

c) comparing the extracted feature vectors with a general speech model and a garbage loop grammar to derive an alternate hypothesis factor indicating the probability that the extracted feature vectors correspond to the characteristics of general speech;

d) normalizing the log difference of the null and alternate hypothesis probability factors by the magnitude of the log likelihood of the null hypothesis factor; and e) rejecting the speech where the difference of the normalized probability factors is less than a rejection factor derived from the utterance length.

2. A method of recognizing speech according to claim 1, wherein the rejection factor comprises a threshold modeled as a polynomial in utterance length T, and wherein a separate rejection threshold $v_i$, is derived for each interval representing the input utterance lengths.

3. A method of recognizing speech according to claim 2, wherein said polynomial is approximated by a piecewise constant approximation.

4. A speech recognition system comprising:

a) a memory for storing:
  i) a plurality of recognition models each representing a known word, sub-word, phoneme or digit within a vocabulary or task grammar;
  ii) a general speech model and garbage loop grammar, and
  iii) a plurality of rejection thresholds modeled as polynomials differing according to the lengths of input utterance and stored as piecewise constant approximations of said polynomials; and b) a processor for receiving an input signal representing a speech utterance and for processing the input signal utilizing the stored models to calculate the respective probabilities that the input signal corresponds to a particular one of the recognition models and to said general speech model; generating a difference signal normalized by the magnitude of one of the probabilities; determining the length of the input utterance; and selecting one of the stored piecewise approximations of said rejection thresholds appropriate to the length of the input utterance.

5. The system as set forth in claim 4 wherein said plurality of recognition models includes one or more Hidden Markov Models.

6. A method for improving the accuracy of a speech recognition system utilizing a plurality of recognition models to identify whether input speech corresponds to phonemes within a task grammar or to general speech characteristics, comprising the steps of:

generating a signal representing the log difference in likelihoods that the input signal corresponds to one of said phonemes or to said general speech characteristics;

normalizing said difference signal according to the magnitude of the log likelihood of said general speech characteristics;

modeling a rejection threshold as a polynomial in utterance length; and rejecting said input speech when said difference signal does not exceed said utterance length dependant rejection threshold.

7. The method as set forth in claim 6 wherein said plurality of recognition models includes one or more hidden Markov models.

* * * * *